US009836035B2

(12) United States Patent
Goldburt

(10) Patent No.: US 9,836,035 B2
(45) Date of Patent: *Dec. 5, 2017

(54) SYSTEM FOR AND METHOD OF ACTING ON CONTAINERS

(71) Applicant: Medea Inc., Pleasanton, CA (US)

(72) Inventor: Tim Goldburt, Ardsley, NY (US)

(73) Assignee: Medea Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,600

(22) Filed: Sep. 25, 2015

(65) Prior Publication Data
US 2016/0018803 A1  Jan. 21, 2016

Related U.S. Application Data

(63) Continuation of application No. 11/821,349, filed on Jun. 22, 2007, now Pat. No. 9,152,968.

(51) Int. Cl.
| | |
|---|---|
| G06Q 30/00 | (2012.01) |
| G05B 15/02 | (2006.01) |
| G06Q 30/02 | (2012.01) |
| G06Q 30/06 | (2012.01) |
| B65D 23/14 | (2006.01) |
| G06F 3/16 | (2006.01) |

(52) U.S. Cl.
CPC ............ *G05B 15/02* (2013.01); *B65D 23/14* (2013.01); *G06F 3/165* (2013.01); *G06Q 30/02* (2013.01); *G06Q 30/0601* (2013.01)

(58) Field of Classification Search
CPC . G08C 2200/00; G08C 2201/70; G08C 19/34
USPC ...................................................... 340/13.24
See application file for complete search history.

(56) References Cited

U.S. PATENT DOCUMENTS

| | | |
|---|---|---|
| 97,669 A | 12/1869 | McMillen |
| D20,656 S | 3/1891 | Dawes |
| D23,100 S | 3/1894 | Fay et al. |
| 719,793 A | 12/1902 | Vogeler |

(Continued)

FOREIGN PATENT DOCUMENTS

| | | |
|---|---|---|
| JP | H07027624 | 1/1995 |
| WO | 03099039 A1 | 12/2003 |
| WO | 2010138107 A1 | 12/2010 |

OTHER PUBLICATIONS

McHenry, Q., "iPhone: Change the Auto-Lock Delay", 3 pages, http://www.tech-recipes.com/rx/2484/iphone_change_the_auto_lock_delay/, Jun. 29, 2007.

(Continued)

*Primary Examiner* — Rokib Masud
(74) *Attorney, Agent, or Firm* — Lowenstein Sandler LLP

(57) ABSTRACT

A computing device identifies a plurality of containers that are collocated at a facility via a network. Each container of the plurality of containers comprises an electronic device integrated into the container without interfering with a content of the container, the electronic device comprising a receiver, a display and speakers. The computing device transmits messages comprising activation signals to electronic devices of the plurality of containers that are collocated at the facility. The messages cause the electronic devices of the plurality of containers to activate, display images using the display and output audio via the speakers together as a group.

15 Claims, 2 Drawing Sheets

(56) References Cited

U.S. PATENT DOCUMENTS

| | | |
|---|---|---|
| 823,008 A | 6/1906 | Vendig |
| 1,262,788 A | 4/1918 | Heidenreich et al. |
| 1,554,191 A | 9/1925 | Alexander et al. |
| 1,653,608 A | 12/1927 | Allen et al. |
| 1,686,354 A | 10/1928 | Wallace et al. |
| 1,856,550 A | 12/1928 | Guenard |
| D79,958 S | 11/1929 | De Wagner |
| 1,769,147 A | 7/1930 | Benjamin et al. |
| 1,770,093 A | 7/1930 | West et al. |
| D85,487 S | 7/1931 | Meyer |
| 3,864,976 A | 2/1975 | Parker |
| 3,965,590 A | 6/1976 | Algaze |
| 3,996,879 A | 12/1976 | Walton |
| 4,607,756 A | 8/1986 | Courtman |
| D285,903 S | 9/1986 | Courtman |
| 4,765,465 A | 8/1988 | Yamada et al. |
| 4,928,412 A | 5/1990 | Nishiyama |
| D314,308 S | 2/1991 | Cogswell |
| D317,123 S | 5/1991 | Colani |
| D318,224 S | 7/1991 | Altobelli |
| 5,125,866 A | 6/1992 | Arad et al. |
| 5,168,646 A | 12/1992 | Dippong et al. |
| 5,201,431 A | 4/1993 | Berger et al. |
| 5,211,699 A | 5/1993 | Tipton |
| 5,297,247 A | 3/1994 | Kan |
| 5,339,548 A | 8/1994 | Russell |
| 5,379,916 A | 1/1995 | Martindale et al. |
| 5,553,735 A | 9/1996 | Kimura |
| 5,575,553 A | 11/1996 | Tipton |
| 5,678,925 A | 10/1997 | Garmaise et al. |
| 5,774,876 A * | 6/1998 | Woolley ............... G01S 5/0289 235/385 |
| 5,823,346 A | 10/1998 | Weiner |
| 5,863,752 A | 1/1999 | Court et al. |
| 5,884,421 A | 3/1999 | Key |
| 5,992,678 A | 11/1999 | Willey |
| 6,037,872 A | 3/2000 | Dunnum |
| 6,062,380 A | 5/2000 | Dorney |
| 6,084,526 A * | 7/2000 | Blotky .................. B65D 17/02 206/459.1 |
| 6,158,870 A | 12/2000 | Ramirez |
| D436,852 S | 1/2001 | Chan |
| 6,213,616 B1 | 4/2001 | Chien |
| 6,302,608 B1 | 10/2001 | Holmes et al. |
| 6,393,401 B1 | 5/2002 | Loudermilk et al. |
| D470,770 S | 2/2003 | Machado et al. |
| 6,527,402 B1 | 3/2003 | Borri |
| D473,469 S | 4/2003 | Claessen |
| 6,588,131 B2 | 7/2003 | O'Connell, Jr. |
| 6,588,593 B2 | 7/2003 | Woskoski |
| 6,747,918 B2 | 6/2004 | Hight et al. |
| 6,762,734 B2 | 7/2004 | Blotky et al. |
| 6,872,116 B1 | 3/2005 | Dunnum et al. |
| 6,923,549 B2 | 8/2005 | Hoy |
| 6,945,418 B2 | 9/2005 | Guido et al. |
| 7,000,343 B1 | 2/2006 | Teichman |
| D521,388 S | 5/2006 | Andoh |
| D521,389 S | 5/2006 | Andoh |
| D522,865 S | 6/2006 | Andoh |
| D523,346 S | 6/2006 | Andoh |
| 7,152,832 B2 | 12/2006 | Wochnick |
| 7,163,311 B2 | 1/2007 | Kramer |
| 7,300,171 B2 | 11/2007 | Sutton |
| D571,153 S | 6/2008 | Lopez |
| 7,383,650 B2 | 6/2008 | Duesler |
| D574,249 S | 8/2008 | Seum et al. |
| D575,583 S | 8/2008 | Morgan |
| 7,413,082 B2 | 8/2008 | Adler et al. |
| D596,037 S | 7/2009 | Slubski |
| 7,690,533 B2 | 4/2010 | Stilley |
| D617,200 S | 6/2010 | Goldburt |
| 7,824,051 B2 | 11/2010 | Walter et al. |
| 7,837,333 B2 | 11/2010 | Chou et al. |
| 7,934,845 B2 | 5/2011 | Yang |
| 7,954,970 B2 | 6/2011 | Goldburt |
| 8,056,273 B2 | 11/2011 | Goldburt |
| 8,123,033 B2 | 2/2012 | Goldburt |
| 8,232,981 B2 | 7/2012 | Sandy |
| 2002/0097195 A1 | 7/2002 | Frank |
| 2002/0104848 A1 | 8/2002 | Burrows et al. |
| 2002/0126150 A1 | 9/2002 | Parry |
| 2002/0190869 A1 | 12/2002 | Blotky et al. |
| 2003/0076672 A1 | 4/2003 | Head |
| 2003/0099158 A1 | 5/2003 | De la Huerga |
| 2003/0122730 A1 | 7/2003 | Frank et al. |
| 2003/0129283 A1 | 7/2003 | Martinez Carballido |
| 2003/0226298 A1 | 12/2003 | Bjork |
| 2004/0004829 A1 | 1/2004 | Policappelli |
| 2004/0026357 A1 | 2/2004 | Beck et al. |
| 2004/0118022 A1 | 6/2004 | Duesler |
| 2004/0140286 A1 | 7/2004 | Zoller |
| 2004/0148117 A1 | 7/2004 | Kirshenbaum et al. |
| 2004/0206828 A1 | 10/2004 | Harris |
| 2005/0024858 A1 | 2/2005 | Johnson |
| 2005/0036301 A1 | 2/2005 | Haines |
| 2005/0134461 A1 | 6/2005 | Gelbman et al. |
| 2005/0152392 A1 * | 7/2005 | Lim .................. H04L 12/1886 370/432 |
| 2005/0161558 A1 | 7/2005 | Stahl et al. |
| 2005/0193612 A1 | 9/2005 | Lowry |
| 2005/0205437 A1 | 9/2005 | Huffman et al. |
| 2005/0207141 A1 | 9/2005 | Boesch et al. |
| 2005/0229449 A1 | 10/2005 | Shepley |
| 2005/0270396 A1 | 12/2005 | Miyashita et al. |
| 2006/0087831 A1 | 4/2006 | Kramer |
| 2006/0118507 A1 | 6/2006 | Feldman |
| 2006/0139928 A1 | 6/2006 | Griffiths et al. |
| 2006/0202042 A1 | 9/2006 | Chu |
| 2006/0231109 A1 | 10/2006 | Howell et al. |
| 2007/0024465 A1 | 2/2007 | Howell et al. |
| 2007/0069883 A1 | 3/2007 | Collier, Jr. et al. |
| 2007/0091123 A1 | 4/2007 | Akashi |
| 2007/0158293 A1 | 7/2007 | Andreani |
| 2007/0299778 A1 * | 12/2007 | Haveson ............... H04L 63/107 705/51 |
| 2008/0023357 A1 | 1/2008 | Whiteis |
| 2008/0034628 A1 | 2/2008 | Schnuckle |
| 2008/0074625 A1 | 3/2008 | Lai et al. |
| 2008/0100469 A1 | 5/2008 | Goldburt |
| 2008/0128300 A1 | 6/2008 | Bahar et al. |
| 2008/0149589 A1 | 6/2008 | Lach |
| 2008/0178251 A1 * | 7/2008 | Shin .................. G08B 13/19621 725/141 |
| 2008/0264816 A1 | 10/2008 | Yeh |
| 2008/0296191 A1 | 12/2008 | Ransch |
| 2008/0314861 A1 | 12/2008 | Goldburt |
| 2008/0317906 A1 | 12/2008 | Goldburt |
| 2009/0293328 A1 | 12/2009 | Bull |
| 2010/0101124 A1 | 4/2010 | Sorensen |
| 2010/0182518 A1 | 7/2010 | Kirmse et al. |
| 2010/0300913 A1 | 12/2010 | Goldburt |
| 2010/0300914 A1 | 12/2010 | Goldburt et al. |
| 2011/0100852 A1 | 5/2011 | Goldburt |
| 2011/0100853 A1 | 5/2011 | Goldburt |
| 2011/0122120 A1 | 5/2011 | Feuilloley |
| 2011/0155604 A1 | 6/2011 | Goldburt |
| 2011/0303579 A1 | 12/2011 | Sanders |
| 2012/0171963 A1 | 7/2012 | Tsfaty |
| 2012/0239470 A1 | 9/2012 | Goldburt |
| 2013/0319892 A1 | 12/2013 | Goldburt |
| 2014/0094126 A1 | 4/2014 | Sandy |

OTHER PUBLICATIONS

International Search Report and Written Opinion from PCT/US2009/006751 dated Aug. 17, 2010.

"Search Report EIC 3600", Nov. 19, 2009, Scientific and Technical Information Center, 36 pages.

* cited by examiner

SYSTEM FOR AND METHOD OF ACTING ON CONTAINERS

RELATED APPLICATIONS

This patent application is a continuation application of U.S. patent application Ser. No. 11/821,349, filed Jun. 22, 2007, which is herein incorporated by reference.

BACKGROUND

The present invention relates to a system for and method of acting on beverage bottles.

It is known to accommodate beverage containers in storage facilities, in beverage store selling facilities such as wine and liquor stores, in serving facilities such as bars of restaurants, etc. However, there is no system or method for acting on the beverage bottles so that they produce corresponding functions as a group, or as an individual bottle in remote fashion and in a systematic way.

Beverage bottles provided with electrical or electronic devices which perform corresponding functions are disclosed in U.S. patent application Ser. No. 11/588,494, which issued as U.S. Pat. No. 9,061,797 on Jun. 23, 2015. It is therefore desirable to create a system and a method which provides systematic activation of corresponding beverage bottles in groups or individually.

SUMMARY

Accordingly, it is an object of the present invention to provide a system for and a method of acting on containers such as beverage bottles.

In keeping with the above described object and with others which will become apparent hereinafter, one feature of the present invention resides, briefly stated, in a system for acting on containers such as beverage bottles, comprising a plurality of containers each provided with a device selected from the group consisting of an electrical device and an electronic device integrated in each of said containers without interfering with a content of the container and providing a function; and means for remotely acting on the devices of at least some of the containers with the use of internet so that said devices produce corresponding actions.

Another feature of the present invention resides, briefly stated, in a method for acting on a beverage bottle, comprising the steps of a plurality of bottles each provided with a device selected from the group consisting of an electrical device and an electronic device integrated in each of said beverage bottles without interfering with a content of the bottle and providing a function, and means for remotely acting on the devices of at least some of the beverage bottles with the use of internet so that said devices produce corresponding functions.

The novel features of which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
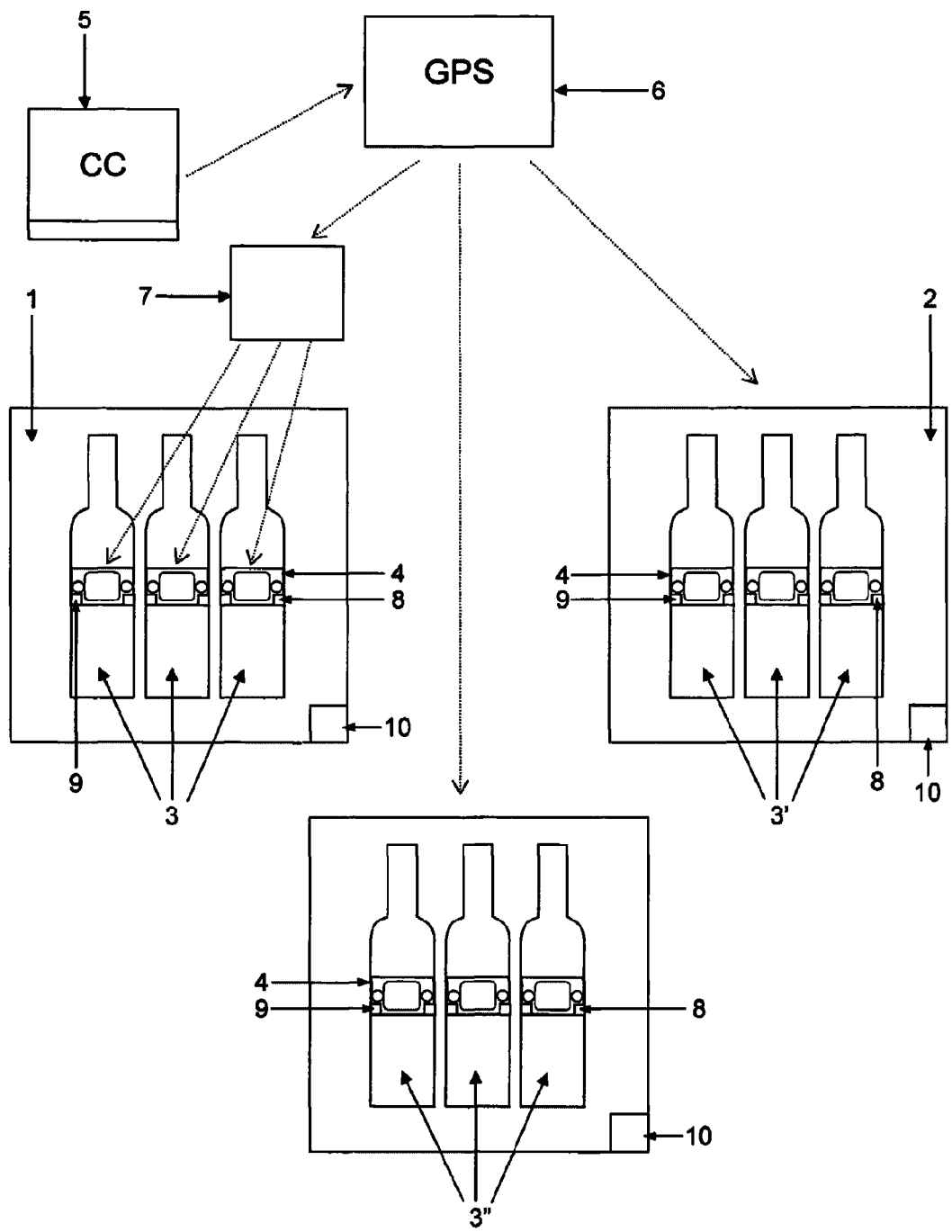
FIG. 1 of the drawings is a view schematically showing a system for and a method of acting on beverage bottles.

A system for the method of acting on beverage bottles shown in FIG. 1 has a plurality of beverage bottles. The beverage bottles are provided with electrical or electronic devices as disclosed, for example, in U.S. patent application Ser. No. 11/588,494. The beverage bottles can be located in different places or facilities, for example in a beverage storage facility 1 as identified with reference numeral 3, in a beverage store selling facility 2 as identified with reference numeral 3', in a beverage serving facility such as for example a bar and restaurant 3", etc.

The bottles 3, 3', 3" are provided with electrical or electronic devices 4 which are disclosed on the above identified patent application. The electrical or electronic devices produce corresponding functions. For example, they cause illumination of the beverage which is contained in the corresponding bottle, they provide an electronic text message in the form of a running strip, they display moving images (for example films), etc.

The system in accordance with embodiments of the present invention is provided with a central control station which is identified with reference numeral 5. It can be formed as an internet based computerized central control which generates and sends signals for corresponding control functions with the use of corresponding computer or computer equipment through the internet.

The central control station 5 activates the devices 4 provided in the bottles 3, 3', 3" so that the devices 4 perform corresponding above identified functions, as well as other functions as can be necessary. The central control station 5 transmits corresponding activation signals. The transmission can be performed for example via a satellite based GPS 6. The central control station 5 sends signals through the transmission device for example the above identified GPS system, to corresponding bottles 3, 3', 3". The devices 4 in the bottles can be activated either individually for each bottle, or for a group of bottles, or for bottles arranged in the corresponding facility 1, or 2, or 3, or a combination thereof.

The transmission of the signals from the central control can be also performed through communication hubs 7 which are connected with the devices 4 of the bottles in the corresponding facilities.

It is to be understood that for the operation of the system and method each device 4 of the bottle can be provided with a corresponding signal receiver 8 for receiving the signals for activating the device 4 of the corresponding bottle.

Code means are further provided. The code means can include a code 9 attached to each bottle, or a code 10 attached to the corresponding facility 1, 2, or 3, so that the signals which are transmitted from the central control station 5 are provided with the corresponding code to activate a corresponding bottle, a corresponding group of bottles, or bottles in a corresponding facility 1, 2 or 3.

As for the construction and the operation of the electrical or electronic devices 4, in an exemplary embodiment it can be identical to the construction and operation of the electronic devices disclosed in U.S. patent application Ser. No. 11/588,494.

Figure 2:
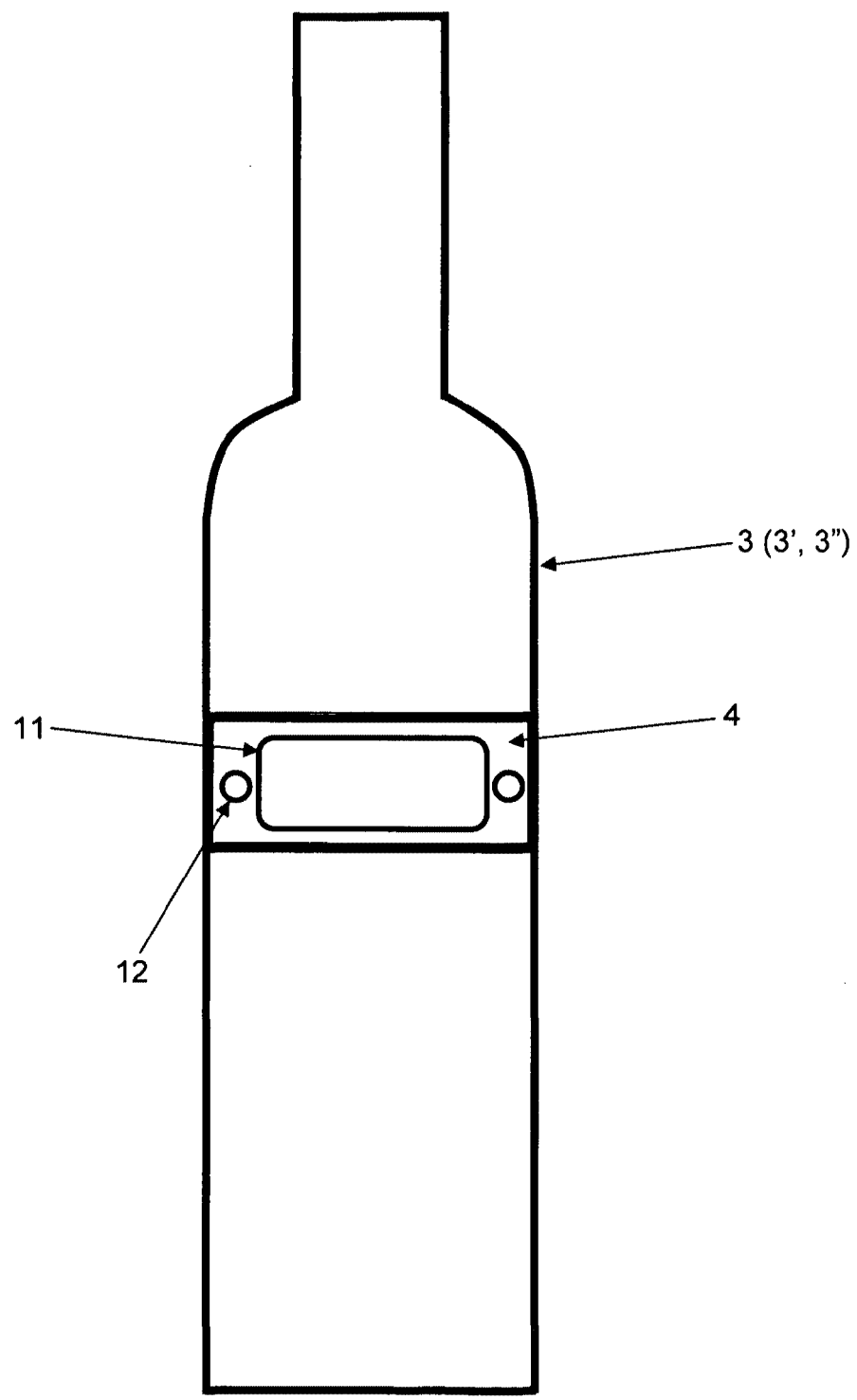
FIG. 2 is a view showing a beverage bottle of the inventive system and method.

FIG. 2 shows an example of the bottle 3, whose action is activated in the inventive system and method. The device 4 of the bottle 3 can be provided, for example, with a screen 11 and speakers 12, for displaying on the screen 11 of video images, movies, videos transmitted via the internet. Additionally, the device 4 may play audio, music, speech, etc. using the speakers 12 to accompany the screen display.

It will be understood that each of the elements described above, or two or more together, may also find a useful application in other types of constructions differing from the type described above.

While the invention has been illustrated and described as embodied in a system for and method of acting on beverage bottles, it is not intended to be limited to the details shown, since various modifications and structural changes may be made without departing in any way from the spirit of the present invention.

Without further analysis, the foregoing will so fully reveal the gist of embodiments of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A system, comprising
   a plurality of containers collocated at a facility, each container of the plurality of containers comprising an electronic device integrated into the container without interfering with a content of the container, the electronic device comprising a receiver, a display and speakers; and
   a computing device communicatively connected to electronic devices of the plurality of containers via a network, wherein the computing device is to:
      identify that the plurality of containers are collocated at the facility; and
      transmit activation signals to corresponding receivers of the electronic devices of the plurality of containers that are collocated at the facility;
   wherein the electronic devices of the plurality of containers are to perform the following operations together as a group responsive to receipt of the activation signals via the receivers:
      activate;
      display images using the display; and
      output audio via the speakers.

2. The system of claim 1, wherein said electronic device further comprises a GPS receiver.

3. The system of claim 1, wherein the network comprises a public internet, the system further comprising:
   a communication hub communicatively connected to the electronic devices of the plurality of containers, wherein the communication hub is located at the facility and connected to the computing device via the public internet, the communication hub to receive the activation signals from the computing device and transmit the activation signals to the electronic devices of the plurality of containers.

4. The system of claim 1, wherein said facility is at least one of a storage facility, a restaurant facility or a retail facility.

5. The system of claim 1, wherein said display is to display at least one of an electronic text message in a form of a running strip or moving images.

6. The system of claim 1, wherein said display is to display at least one of video images or movies, and said speakers are to output at least one of music or speech.

7. The system of claim 1, wherein the electronic device further comprises an illumination module to illuminate contents of the container, and wherein the electronic devices of the plurality of containers are to illuminate contents of the plurality of containers together as a group responsive to receipt of the activation signals.

8. The system of claim 1, wherein the computing device is further to transmit the images and the audio to the electronic devices of the plurality of containers via the network.

9. A method comprising:
   identifying, by a computing device and via a network, a plurality of containers that are collocated at a facility, each container of the plurality of containers comprising an electronic device integrated into the container without interfering with a content of the container, the electronic device comprising a receiver, a display and speakers; and
   transmitting, by the computing device, messages comprising activation signals to corresponding receivers of electronic devices of the plurality of containers that are collocated at the facility, wherein the messages cause the electronic devices of the plurality of containers to activate, display images using the display and output audio via the speakers together as a group.

10. The method of claim 9, wherein said electronic device further comprises a GPS receiver.

11. The method of claim 9, wherein transmitting the messages to the electronic devices of the plurality of containers comprises:
    transmitting the messages to a communication hub located at the facility and communicatively connected to the electronic devices; and
    causing the communication hub to transmit the messages to the electronic devices of the plurality of containers.

12. The method of claim 9, wherein said facility is at least one of a storage facility, a restaurant facility or a retail facility.

13. The method of claim 9, wherein displaying the images comprises at least one of displaying an electronic text message in a form of a running strip or displaying a moving image.

14. The method of claim 9, wherein said messages comprise at least one of images, movies, videos, music or speech.

15. The method of claim 9, wherein the messages further cause illumination modules of the electronic devices to illuminate contents of the plurality of containers together as a group.

* * * * *